May 15, 1951 H. C. McKAY 2,552,990
MULTIPLE PURPOSE CABINET TABLE PHOTOGRAPHIC
PROJECTION PRINTER
Filed Oct. 28, 1947 7 Sheets-Sheet 1

INVENTOR.
HERBERT C. MC. KAY
BY
ATTORNEY

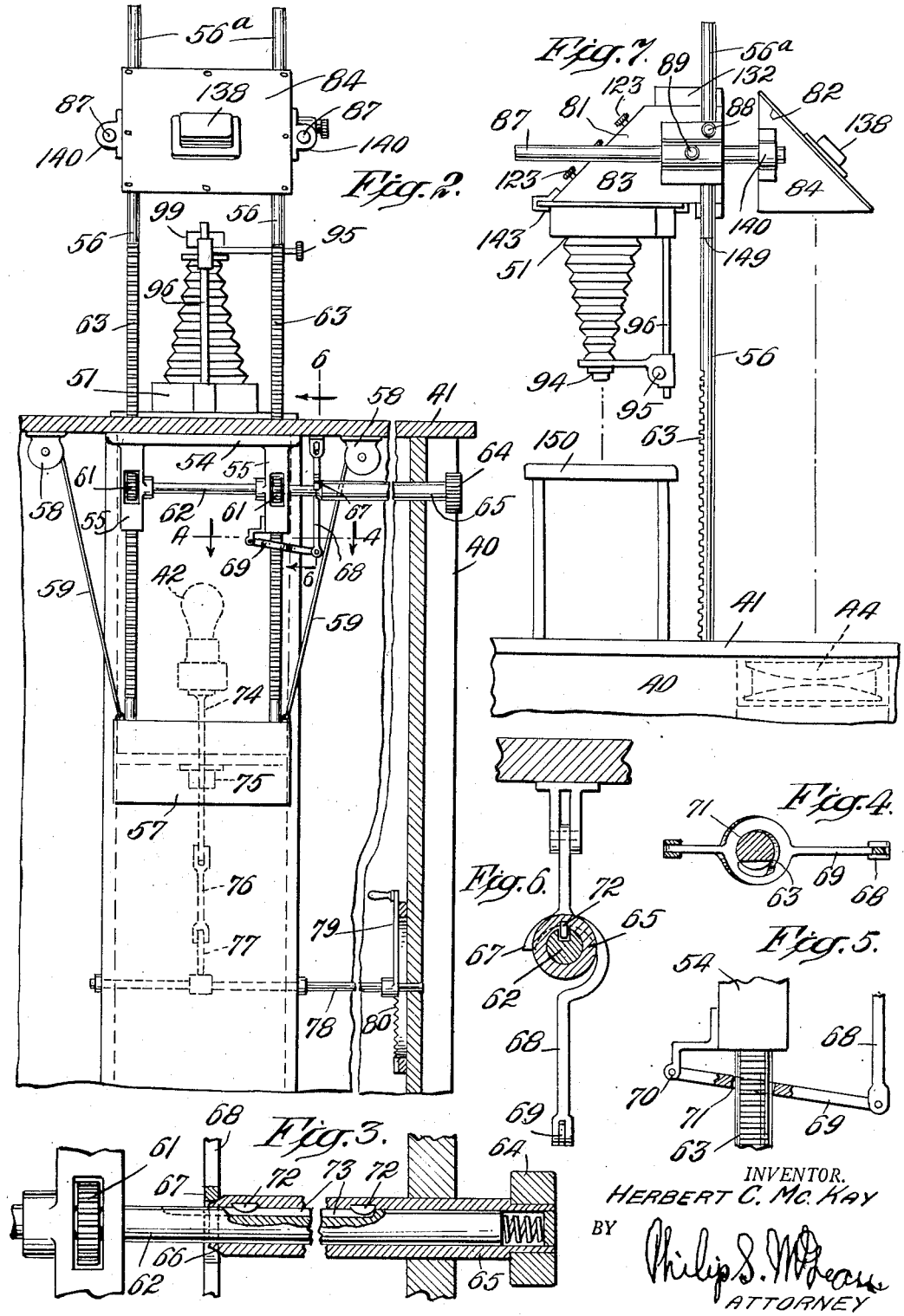

May 15, 1951
H. C. McKAY
2,552,990
MULTIPLE PURPOSE CABINET TABLE PHOTOGRAPHIC
PROJECTION PRINTER
Filed Oct. 28, 1947
7 Sheets-Sheet 3
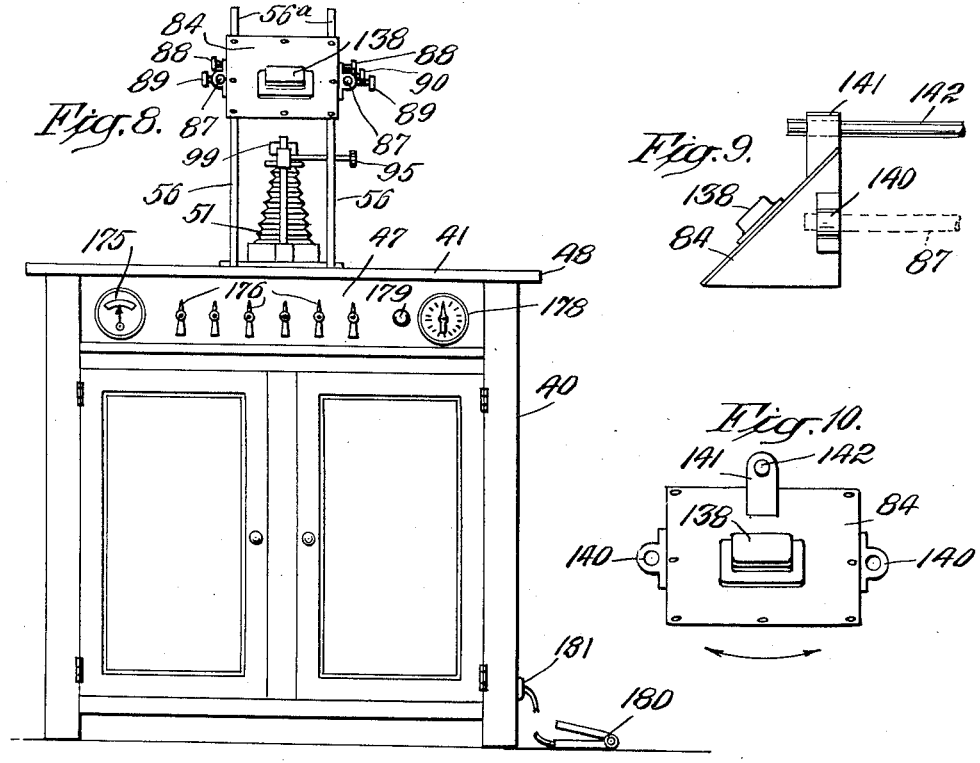
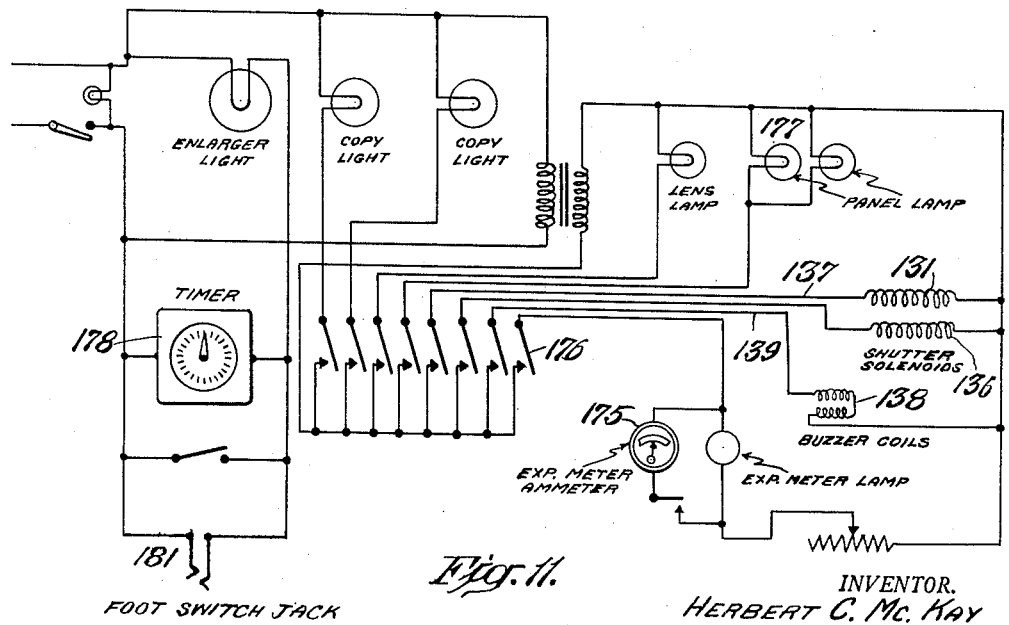
INVENTOR.
HERBERT C. McKAY
BY
Philip S. McGrau
ATTORNEY

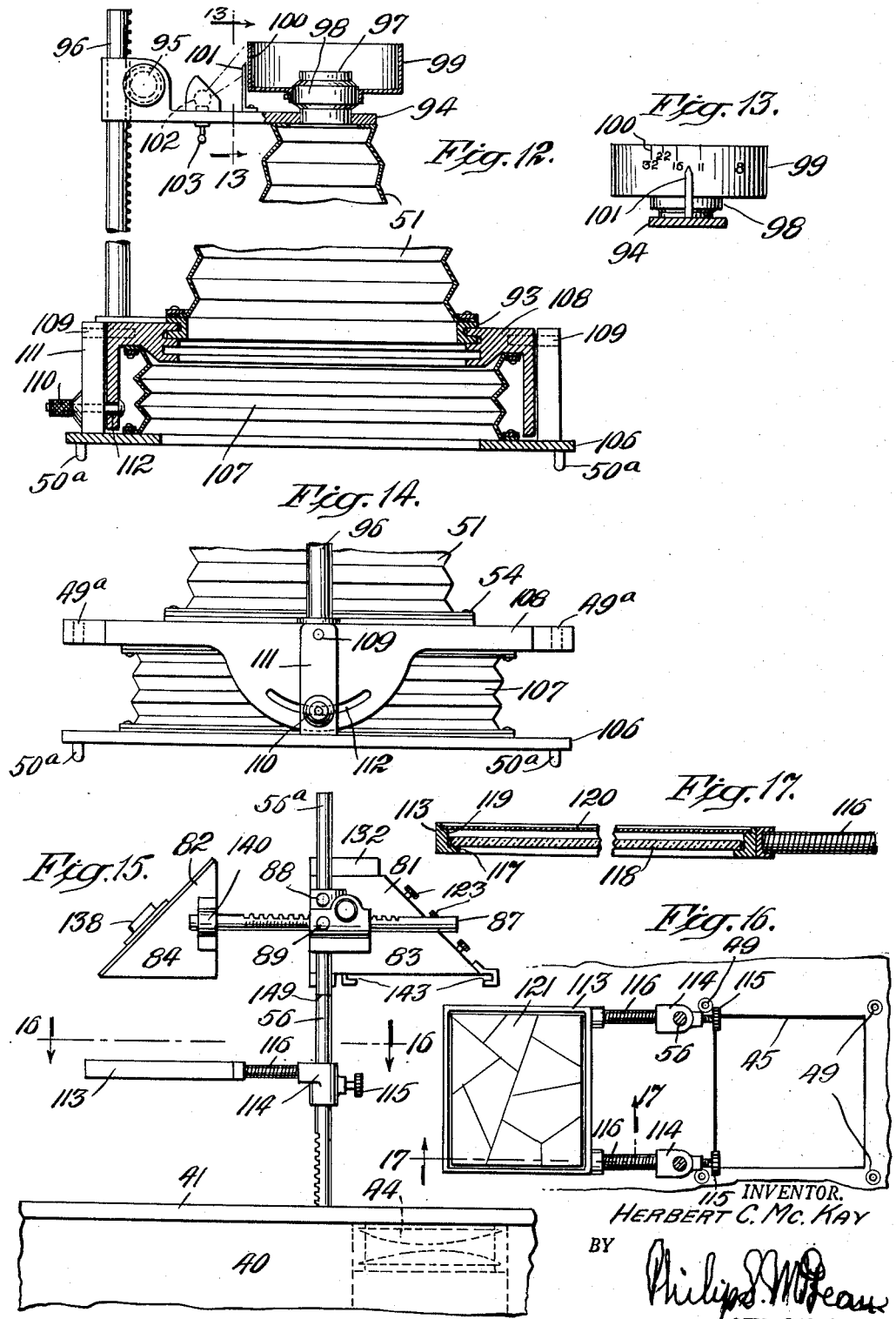

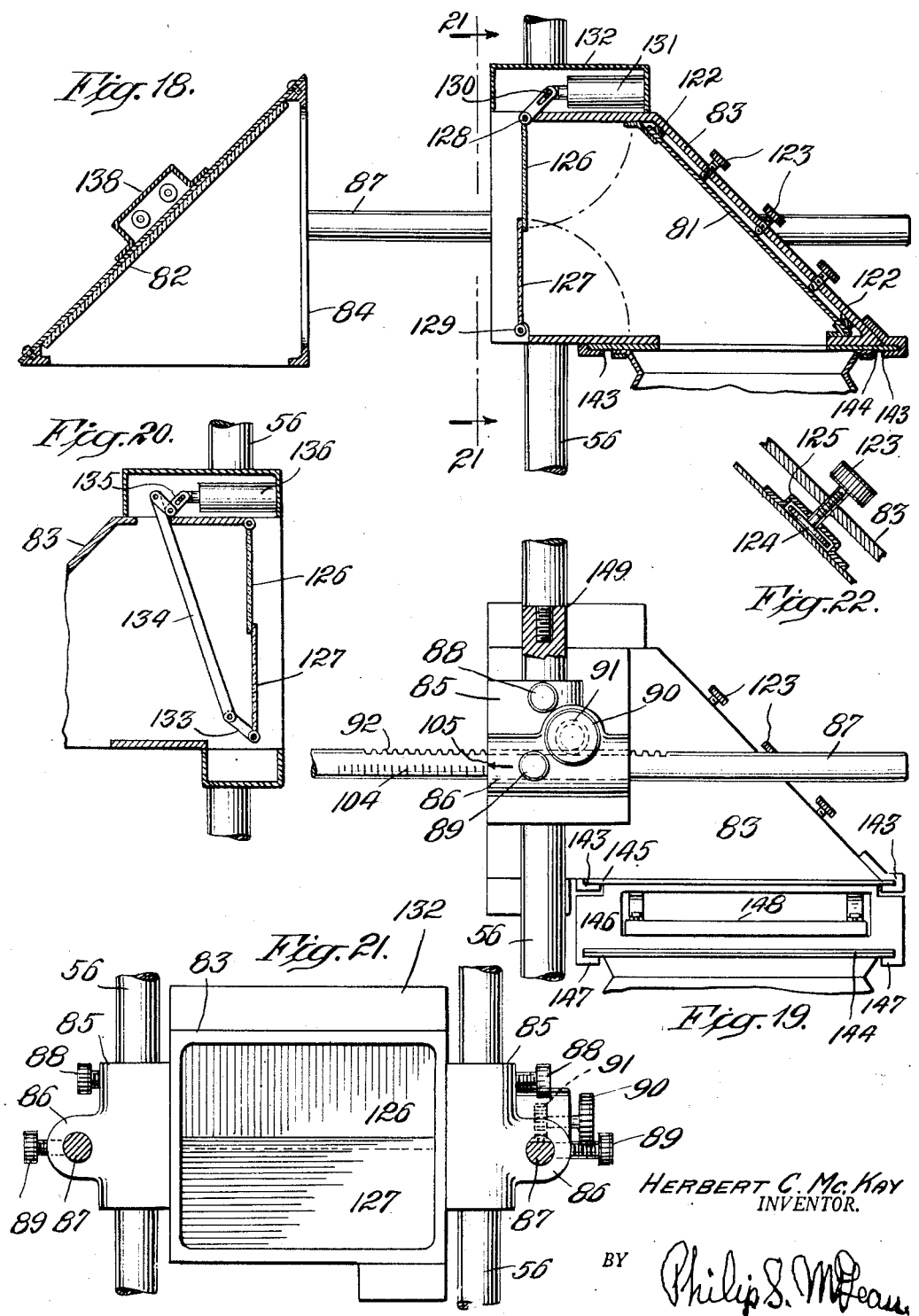

May 15, 1951     H. C. McKAY     2,552,990
MULTIPLE PURPOSE CABINET TABLE PHOTOGRAPHIC
PROJECTION PRINTER
Filed Oct. 28, 1947     7 Sheets-Sheet 6
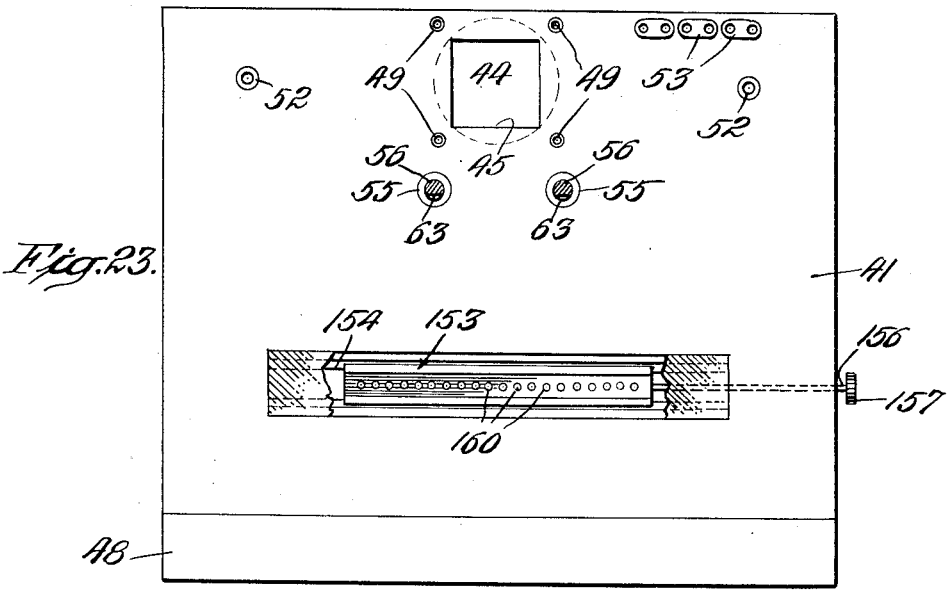
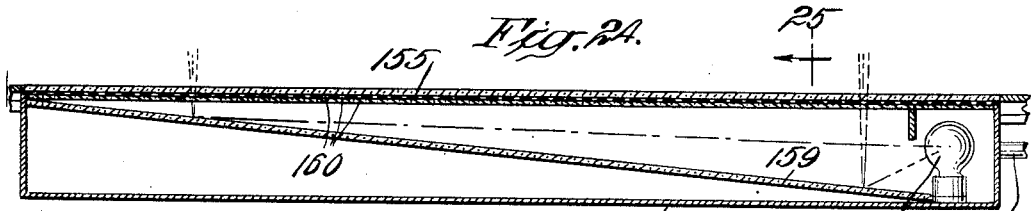
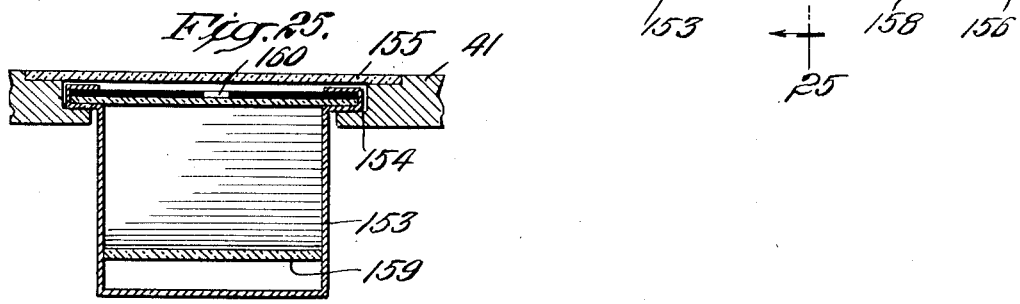
INVENTOR.
HERBERT C. McKAY
BY
*Philip S. McLean*
ATTORNEY

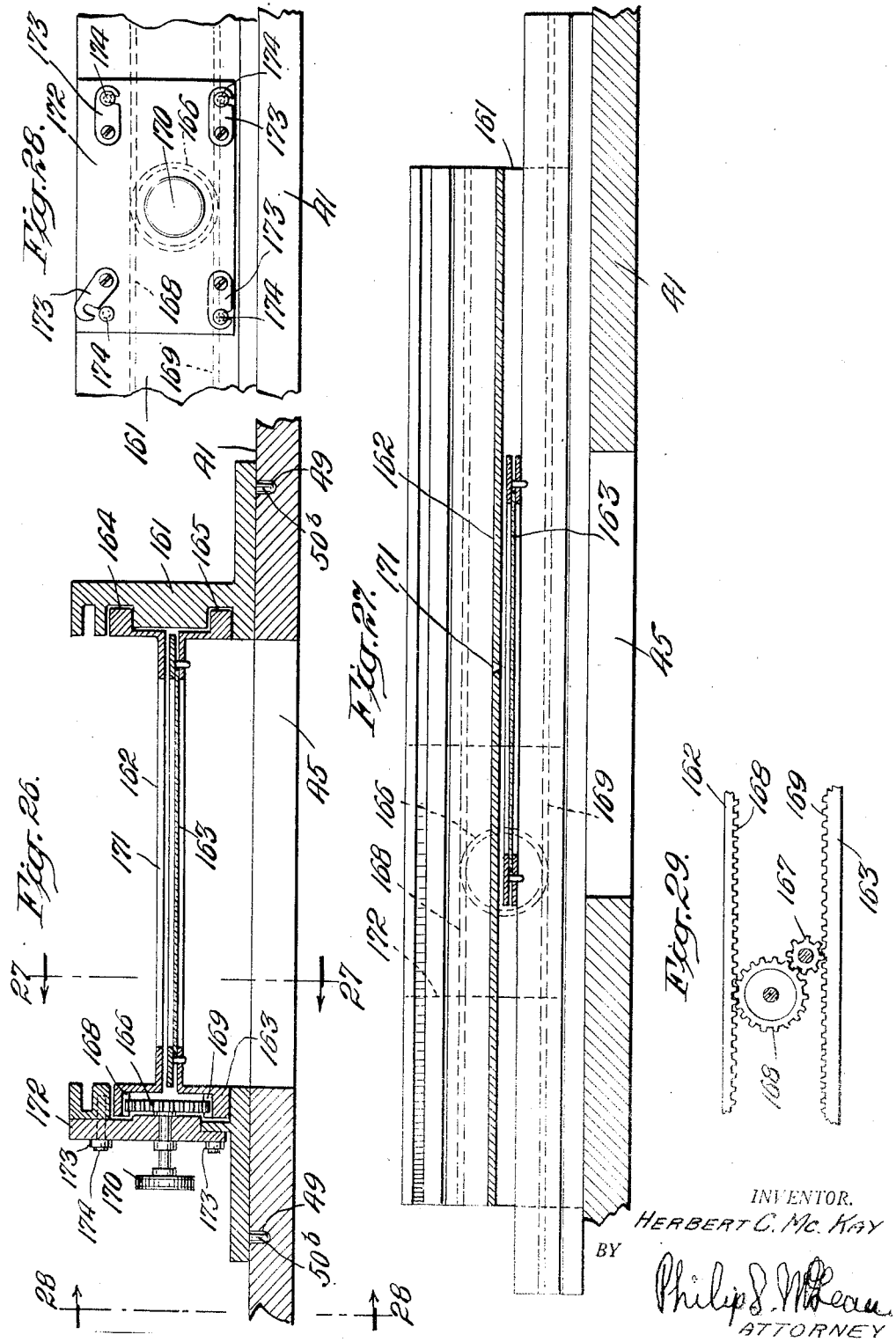

Patented May 15, 1951

2,552,990

UNITED STATES PATENT OFFICE 2,552,990

MULTIPLE PURPOSE CABINET TABLE PHOTOGRAPHIC PROJECTION PRINTER

Herbert C. McKay, Eustis, Fla., assignor of fifty per cent to Anthony Martinek, New York, N. Y.

Application October 28, 1947, Serial No. 782,526

11 Claims. (Cl. 88—24)

The invention here disclosed relates to photographic printers of the projector type.

Special, important objects of the invention are to combine the stability of a low center of gravity and projection from above, thus to avoid vibration effects and to provide for free observation and control of the image.

Other important and related objects are to furnish this apparatus in the form of a cabinet, a substantial article of furniture with the heavy parts of the projector, the lamphouse, condensers and the like, housed within the base structure and with a flat top for free and easy manipulation of negatives, prints, shaders and the like, substantially at or over table level.

Important objects of the invention are to provide a maximum range of enlargement, reduction, projection and the like, all within a practical size and arrangement of apparatus.

It is a purpose of the invention to provide apparatus which while relatively simple, will be adaptable to many different uses and purposes and thus enable an operator to accomplish all the many variations in printing and projecting required in the various fields of illustration.

Other desirable objects and the novel features of the invention through which such objects are attained are set forth or will appear in the course of the following specification.

The drawings accompanying and forming part of the specfication illustrate certain present embodiments of the invention. Structure, however, may be modified and changed as regards the immediate illustration, all within the true spirit and broad scope of the invention as hereinafter defined and claimed:

Fig. 1 in the drawings is a vertical cross sectional view of one of the projectors with the parts set for enlarging;

Fig. 2 is a broken longitudinal sectional view with parts appearing as on substantially the line 2—2 of Fig. 1;

Fig. 3 is a broken, enlarged, part sectional view of the adjusting shaft mechanism for raising and lowering the reflector head;

Fig. 4 is a horizontal sectional detail of the lock mechanism for the reflector head as on substantially the plane of line 4—4 of Fig. 2;

Fig. 5 is a broken and part sectional side view of this lock mechanism;

Fig. 6 is a broken vertical sectional view on substantially the plane of line 6—6 of Fig. 2, showing the lifting lever for effecting release of the lock;

Fig. 7 is a broken end view of the machine, showing the reflector head reversed and extended for greatly reduced projection;

Fig. 8 is a front view of the cabinet with the parts set for enlarging as in Fig. 1;

Figs. 9 and 10 are a broken side view and a front view of a form of front reflector suspended so that it may be turned to project to one side or the other;

Fig. 11 is a general wiring diagram;

Fig. 12 is a broken vertical sectional view of the camera unit as combined with the negative holder;

Fig. 13 is a detail of the iris adjustment scale as appearing on substantially the plane of line 13—13 of Fig. 12;

Fig. 14 is a broken side elevation of the negative tilter;

Fig. 15 is a broken end view illustrating use of the vignetter attachment;

Fig. 16 is a broken horizontal sectional view taken on substantially the plane of line 16—16 of Fig. 15;

Fig. 17 is a broken sectional detail on a larger scale, as on substantially the plane of line 17—17 of Fig. 16;

Fig. 18 is a broken vertical sectional view of the reflector head showing various details of both back and front reflectors;

Fig. 19 is a broken part sectional side view of the back reflector as in use for copying camera purposes;

Fig. 20 is a broken part sectional detail of the solenoid control for the lower half of the reflector shutter;

Fig. 21 is a broken vertical sectional view on substantially the plane of line 21—21 of Fig. 18, showing the shutters in closed position;

Fig. 22 is a broken sectional detail of one of the reflector distorting screws;

Fig. 23 is a top plan view of the table-top of the cabinet, broken away to indicate details of the exposure meter set in the top and with the reflector head supporting rods shown in section;

Fig. 24 is a broken, enlarged, longitudinal sectional view of the exposure meter or photometer;

Fig. 25 is a further enlarged cross sectional detail as on substantially the plane of line 25—25 of Fig. 4;

Figs. 26 and 27 are broken tranverse and longitudinal sectional views of the elongation control mechanism, Fig. 27 appearing as on substantially the plane of line 27—27 of Fig. 26;

Fig. 28 is a broken detail of the adjusting mechanism appearing as on substantially the plane of line 28—28 of Fig. 26;

Fig. 29 is a broken detail of one form of gearing for the elongation control.

Figure 1:
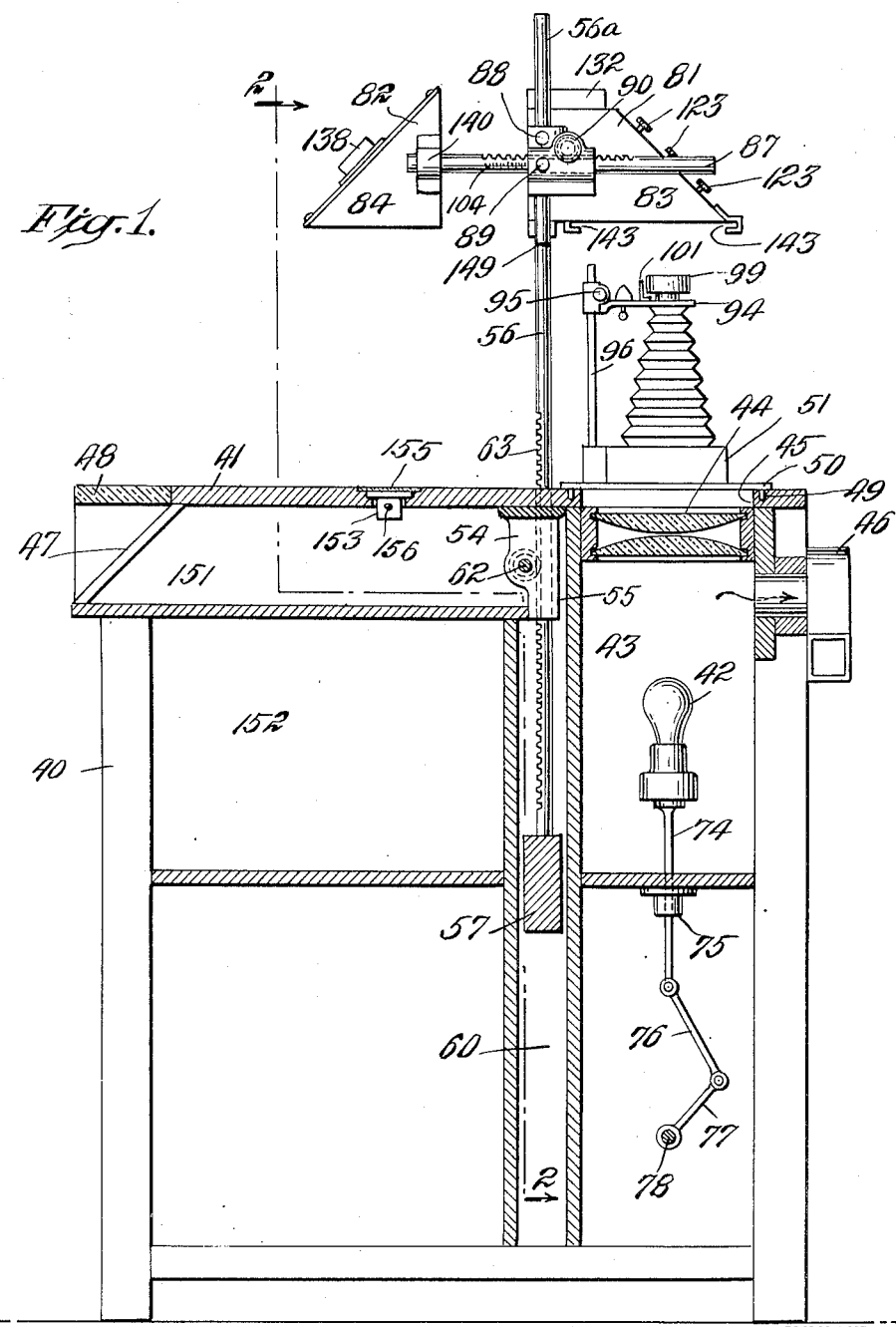

One of the first features of the invention to be noted is that the base structure is in the form of a cabinet 40 of substantial proportions and weight to provide a firm, solid, non-vibrating base and a housing as well for the heavier portions of the apparatus. This cabinet base is shown as having a flat table top 41 for the convenient handling and support of the various parts used in this new system in which the light is projected upwardly through the top of the cabinet to one reflector and thence directed downwardly from a second reflector onto the table top.

Fig. 1 shows how the projection lamp 42 is located in a lamphouse compartment 43 in the back of the cabinet with the condensing lenses 44 above the lamp and below the light aperture 45 in the table top.

A suction blower is indicated at 46 for cooling purposes, this at the back of the cabinet where it is entirely out of the way.

An inclined instrument and control panel 47 is shown inset at the front of the cabinet beneath a transparent front edge strip or section 48 of the top.

The top is further fashioned to provide a working table for positioning and supporting the cameras and various other parts used in the apparatus. Thus, as shown in the plan view, Fig. 23, the cabinet top has positioning sockets 49 about the light aperture 44 to receive the pins 50 on the camera base 51, Fig. 1, and other such units as may be substituted in place of the camera base.

Sockets 52, Fig. 23, are shown set in the top to receive lamp fixtures for local illumination or extension cord plugs for power uses, and pin sockets 53 are shown at the back of the top for electric cords to energize buzzers, solenoids and other electrical devices that may be used.

At the mid-portion of the cabinet there is provided a rigid casting or body 54, Figs. 1 and 2, having parallel vertical guides 55 therethrough for support rods 56 carrying the vertically adjustable reflector head.

These supporting rods are shown in Figs. 1 and 2 as rigidly joined together at their lower ends by a more or less massive strut or base connection 57.

To facilitate easy operation this whole movable structure is shown counter-balanced by spring counter-balances 58, Fig. 2, connected with opposite ends of the heavy base piece 57 by tapes or cords 59.

The unifying weight and counter-balance mechanism for the support rods is shown operating in a compartment 60 separate from the rest of the cabinet where it will not interfere with or be affected by objects or other accessories permanently or temporarily housed within the cabinet.

Vertical adjustment of the supporting rods is effected, in the illustration, by gears 61 on a horizontal shaft 62 meshing with racks 63 cut in or carried by the rods. This shaft is hand operated, in the illustration, by a knob 64 which serves also to control locking and unlocking of the rods by being carried by a sleeve 65 slidable over the shaft, said sleeve having a beveled inner end 66 engageable with an overstanding circular portion 67 of a link 68 to lift that link and cause it in turn to lift the locking lever 69. The latter, as shown in Figs. 2, 4 and 5, is pivotally supported at 70 so that it may drop down to cause the passage 71 therein to engage the rod 63 with a binding grip. This locking or holding grip may be released at any time by simply sliding the cam sleeve 65 inward to lift the link 68 and hence the locking lever suspended thereby.

Thus by an in-and-out motion of the knob 64 the supporting rod lock may be released and engaged at will. Rotation of this knob through engagement of keys 72 in the sleeve 65 with a keyway 73 in the shaft, imparts rotation to the shaft to raise and lower the supporting rods.

While generally suitable to operate the reflector head lifting, lowering and locking mechanism by hand, it is contemplated that when so desired this mechanism may be motor driven.

The projection lamp 42 is shown in Figs. 1 and 2 as carried by a rod 74 operating vertically in a guide 75, connected at its lower end by a pivoted link 76 to a rock lever 77 on shaft 78. This forms a knee action for focusing the lamp by turning of shaft 78, and the latter is shown as equipped with a hand lever 79 adjustably engageable in detents in a circular or arcuate holding rack 80. Thus the light may be quickly focused and secured in proper focal adjustment.

The reflector head comprises, in the present illustration, a downwardly and forwardly inclined back reflector 81 spaced vertically above the table and a rearwardly inclined front reflector 82 spaced horizontally in front of the back reflector and faced downwardly toward the table.

These reflectors, as shown particularly in Fig. 18, are enclosed within suitable casings 83, 84, the first shown as having side bosses or brackets 85 sleeved over the vertical supporting rods 56 and carrying horizontal bearings 86 for the horizontally sliding rods 87 mounting the front reflector.

This head structure is adjustably and detachably secured on the supporting rods, in the present instance, by set screws 88.

Similarly, the front reflector is shown removably secured in its horizontally adjusted relation by set screws 89 engaging the rods 87.

Horizontal adjustment of the front reflector is shown as effected by a knob 90, Figs. 19 and 21, operating on pinion 91 in engagement with a rack 92 cut in one of the rods 87.

For enlargement purposes the apparatus may be used as shown in Figs. 1, 2 and 8, with the camera unit located by pins 50 in position over the light aperture 45, said unit having a base constructed to retain a negative holder, the image being directed on the back reflector 81 for transmitting the image after a first enlargement, forwardly in a second stage of enlargement to the front reflector 82 for transmission in further enlargement to sensitive medium on the table-top beneath the front reflector. In this manner practically any desired degree of enlargement can be effected without unduly extending the reflector head above the table-top.

The camera unit may be constructed as generally indicated in Fig. 12, with the base portion 51, Fig. 1, grooved or otherwise fashioned at 93 to receive or cooperate with a film or copy holder or other unit and with the lens board or plate 94 mounted for adjustment by a focusing knob 95 on a guide rod 96.

To enable accurate setting of the iris diaphragm at 97, the iris adjusting ring 98 is shown as carrying a drum 99 having a scale 100 for the pointer 101, the latter receiving illumination from a small, protected pilot light 102 controlled by a finger switch 103.

The construction and arrangement disclosed enables operations to be carried out as on an open work-table with everything in full view and with adjustments and settings for the most part at substantially table level. The entire base structure is solid and substantially free of vibration. The reflector head is of light but rigid construction and firmly held so as likewise to be substantially free of vibration. Light focusing, vertical and horizontal adjustments of the reflectors, focusing of the camera and the handling of negatives and paper are all quickly and easily accomplished from a position directly in front of and over the top of the cabinet.

In the special combination disclosed with the lamphouse stationary and the light projected upwardly, there are no heavy parts to be moved up and down and an increase in optical path is obtained, twice that of the mechanical extension above the top.

The horizontal extension of the front mirror adds to the length of the optical path and enables the reflector to be centered above a large sheet of paper. This horizontal adjustment may be assisted by means of a scale 104, Fig. 19, on one of the horizontal support rods 87 for registering with an index 105 on the guide through which it operates.

The open, table-like construction facilitates easy use of shaders and various forms of attachments.

In Figs. 12 and 14 a tilter is shown interposed between the top and camera base, the same comprising a base plate 106 having pins 50a to fit the locating sockets of the top and carrying a flexible bellows 107 connected with the tilting table 108 pivotally supported on the base plate at 109 and provided with sockets 49a or other such means for locating and supporting the camera base thereon. A clamp screw is indicated at 110 for securing the table of the tilting attachment in adjusted relation, said screw being mounted on one of the pivot brackets 111 and extending through an arcuate slot 112 in the tilting portion of the apparatus.

Other attachments such as vignetters, montages, iris diaphragms and the like, may be mounted on the vertical support rods 56.

This may be accomplished as shown in Figs. 15, 16 and 17, by providing a vignette frame 113 supported by sockets 114 engaged over the rods 56 and held at a desired height by set screws 115.

Flexible coil springs 116 supporting the vignette frame from the collars 114 permit the attachment to be more readily engaged over the supporting rods and enable various effects to be obtained by tapping or shifting the frame by hand.

To enable the same frame to be used for various purposes it may be constructed as shown in Fig. 17, with a ledge 117 about the bottom to removably support a transparent cover 118, and a ledge 119 about the top to removably support a vignetting mask 120, or the like.

Fig. 16 shows how the vignetter frame may be used to hold a typical montage mask 121.

An iris diaphragm or other such devices may be mounted in the vignetter frame 113 by providing them with suitable bases to fit the top supporting ledge 119 of the frame.

Various distortion and displacement effects may be accomplished by constructing the primary mirror 81 as shown in Figs. 18 and 22, of flexible material such as polished sheet metal, held about its edges in a yielding support 122 and engaged by screws 123 turning in the back of the reflector head 83.

These reflector distorting screws may be disposed in any pattern for bending the reflector as desired and, further, they may be arranged as shown in Fig. 22, to apply a concaving pull as well as a convexing pressure to the mirror, the same being accomplished by equipping the screws with heads 124 at their inner ends engaged in holding sockets 125 on the back of the mirror.

Other forms of mirrors or reflectors may be employed. It is contemplated that in some instances prisms may be used for reflectors.

The top shutter blade is shown as having crank connections 130 at one end operable by a solenoid 131 enclosed in a casing 132 on top of the hood, and the lower blade is shown as having crank and linkage connections 133, 134, 135, by which it may be operated by another solenoid 136.

These solenoids 131 and 136 may be energized to swing the shutters closed as by electrical connections plugged into the pin sockets 53 in the top of the cabinet, and indicated in a general way at 137 in the wiring diagram, Fig. 11.

The reflectors or reflector hoods may incorporate other special features.

Thus as indicated in Figs. 1 and 18, the front reflector hood 84 may have a buzzer 138 mounted thereon for creating diffusion effects, the same being energized when required, as by wiring connections 139, Fig. 11, plugged into the pin sockets 53, Fig. 23.

Provision for substituting different reflectors and reflector hoods is accomplished by making these hoods readily removable from the horizontal supporting rods 87 as by providing them with side sockets 140 to removably engage over the ends of the rods.

Figs. 9 and 10 show how the reflector hoods may be constructed with centrally disposed extension sockets 141 at the top for removable engagement over a central supporting rod 142 which may be extended from the back reflector or from a special fitting engaged over the supporting rods 56. In this centrally suspended form of mounting the reflector may be swung to one side or the other as indicated in Fig. 10, to direct the beam sideways instead of directly downward.

The reflector head may be constructed to accommodate and cooperate with various attachments and accessories. In Figs. 1 and 18 it is shown equipped with channels 143 to take the base flange 144 of a camera unit or the like.

Fig. 19 shows how a copying camera may be used by engaging the base flange 145 of a holder 146 for a copying camera in the hood channels 143 and engaging the camera flange 144 in similar holding channels 147 on the holder. The holder or adapter 146 is constructed to accommodate the ground glass carriage and other details 148 required for the copying camera.

When using the copying camera as described, the front of the rear reflector hood 83 may be closed by a special cover plate and this plate may carry a focusing magnifier to enable accurate focusing on the ground glass.

Fig. 7 shows how the reflector head may be reversed for reduction purposes to locate the larger front reflector 82 at the back and the smaller, rear reflector 81 at the front, the camera base in this case being attached to the holding flanges 143.

To gain maximum reduction, extension pieces 56a may be coupled by screwing them into sockets in the upper ends of the supporting rods at 149 and the print may be supported on an auxiliary table 150 placed on the table as close as practicable to the lens head 94 of the camera.

The parts may be so designed that with the reflector head and extension sections of the supporting rods or posts removed, the main portions of the posts may be lowered to bring the ends flush with the top of the cabinet.

Under such conditions the reflector hoods, camera units and accessory parts may be stored in the cabinet as in drawers or shelves provided, for example, in the upper and lower compartments, as indicated at 151, 152, Fig. 1. The cabinet base may thus be further utilized as a place for storage of all accessory features and as a table for use as such when not in service as an enlarger, projector or the like.

When desired, an infinite degree of enlargement may be effected upon removing the front reflector hood 82, as in Fig. 1, and projecting the image from the primary reflector 81 upon a convenient wall or screen.

As shown particularly in Figs. 23, 24 and 25, an exposure meter or photometer may be mounted in the top of the cabinet in position beneath the front reflector, the same comprising a casing 153 slidable in a guideway 154 beneath a transparent panel 155 in the top, the same being laterally shiftable as by means of a slide rod 156 provided with a knob or handle 157.

This exposure meter may be of conventional design, as shown, embodying a lamp 158 in the casing 153, projecting light onto an inclined diffusing surface 159 beneath the openings 160 in the top of the lamp casing.

This exposure meter, sunk in the top of the cabinet, is not in the way at any time and is always available for use whenever required or desired.

An attachment or accessory for elongation control is illustrated in Figs. 26 to 29, embodying a base 161 positioned over the light aperture 45 by pins 50b entered in the sockets 49 and carrying differentially operated slit mask and negative holders 162, 163. These are shown mounted in guide tracks 164, 165, and they are geared together so that they may be moved in the same or opposite directions and at the same or different speeds.

In the illustration the gearing is indicated simply as a pair of meshed gears 166, 167, of different size, in engagement with racks 168, 169, on the slit mask and negative holder, respectively, and one operable by a knob or turning device 170. Actually a motor may usually be provided for operating these elements at constant equal or proportioned speeds and in the same or opposite directions to effect desired degrees of expansion or compression of the image.

The slit in the mask is indicated at 171 and in order that gears may be interchanged to provide different rates of movement, the desired companion gears may be mounted in blocks 172, Figs. 26 and 28, which may be detachably secured over the side of the base 161, in position to engage the racks 168, 169, by hook latches 173 on the block, engageable over studs 174 projecting therethrough from the base 161. This construction enables different gear sets to be quickly interchanged.

While only a few accessory features have been shown, it will be evident that the invention enables the use of many different attachments and the attainment of various results, practically unlimited in number.

All features, including the storage of attachments not in immediate use, can be combined in the single cabinet structure. This includes the various controls and outlets that may be required for different projection and printing operations.

The control panel 47, as shown in Fig. 8, may carry the various electrical instrumentalities required or desired, such as a microammeter 175 for a photoelectric meter, if the latter type of meter is used, various control switches 176 for the shutter solenoids, buzzer, panel illuminating lamps 177 and the like, electrical timing switch 178 and setting knob 179. These various instruments and controls are all clearly visible at the front of the cabinet, and from above through the transparent front panel 48 of the cabinet top.

A jack for a foot switch 180 is shown set in the end of the cabinet at 181, Fig. 8, and if desired other such electrical outlets may be provided.

Auxiliary light that may be desired when using the apparatus as a copying camera is immediately available by simply plugging in lamp holders into the sockets 52, Fig. 23, in the top of the cabinet, and these same outlets may be employed for the use of extension cords for power or illuminating purposes.

All the usual and many special features for projection printing are combined in the one self-contained cabinet.

The positioning sockets 49 in the top of the cabinet are shown in Fig. 23 arranged as the corners of a square so that each device used in the apparatus may be rotated into any one of four different positions. This, and the fact that all such devices are provided with corresponding sockets in their upper faces enabling any one to be mounted on top of any other, provide for an infinite variety of combinations.

As an enlarger the apparatus may be used as an excellent projector for any type of lantern slide, including handwriting as it is being written upon transparent paper, polarized light specimens, living cultures in glass holders, and the like.

The built-in exposure meter in the top of the cabinet enables the whole useful range of enlarging intensities to be quickly and easily measured. In use the image may be projected upon the open table. By sliding the handle 157 out and in, the meter may be shifted across the table and the negative adjusted, if necessary, to read an area in any portion of the negative.

The contrast meter thus incorporated in the enlarger provides accurate indication of contrast in the image, enabling selection of correct paper grade. The most opaque highlight and the most transparent shadow may be read and the highlight factor be subtracted from the shadow factor to get as a remainder an index indicating contrast. Then by reference to a table which may be furnished as a part of the meter, the proper grade of paper to be used under the conditions will be known.

The instrument panel 47 may be of semi-translucent red material with the panel lamps 177, Fig. 11, in the back of the same and thus serving as pilots.

With the inverted lamphouse mounted in the back of the cabinet and directing the light upwardly instead of downwardly, all heavy parts are contained within and supported at low level within the cabinet. In the end the double reflected beam is directed downwardly upon the table-like cabinet top, where all effects can be best observed and controlled. This top, if desired, can be completely cleared by simply lifting the reflector head off the supporting rods 56 and lowering these to a flush position.

The front reflector hood 84 is readily removable and the entire reflector head can be easily lifted off and then be secured in reversed relation on the supporting rods. In making reductions with the parts in this reversed relation, if the light glare is found objectionable an auxiliary bellows may be used to extend from the negative up to the housing 84 of the larger mirror.

The distortion screws 123 on the back mirror may be used for caricature work and irregular distortions. Corrections may be made for linear distortion by using the negative tilter or by tilting the front reflector and such corrections or modifications may be repeated since they are mechanical and calibrated or capable of calibration.

Elongation and modification can be effected with the elongation device and may be combined in two directions, thus, for example, to compensate camera distortion and at the same time either elongate or compress the image in either of the two directions.

The use of the vignetter provides for controlled prints by semi-automatic shading and the production of controlled montage prints.

The tilting of the front mirror as indicated in Figs. 9 and 10, enables compensations to be made for wedge distortion resulting from tilting the camera upward when making a picture and enables distortion to be introduced independently of and at an angle to the distortion of the distorting negative holder and to center the image upon a sheet of paper too large to be centered by the horizontal extension rods.

What is claimed is:

1. A vibrationless projection printer having all heavy parts below table level, camera and other adjustment operations carried out at table level and light projected downwardly from above with clear intervening space for observation and free manipulation and comprising a cabinet of heavy, substantial construction having a table top provided with a light aperture therein, a lamphouse in the body of the cabinet and directly upwardly through said light aperture, spaced supporting rods guided for vertical movement up through said table top and rigidly connected together at their lower ends by a heavy brace disposed within the cabinet below said table top, a reflector head mounted on said supporting rods and having a back reflector disposed above the light aperture and a front reflector in the line of projection of said back reflector and directed downwardly toward the table top and means for effecting vertical adjustments of said reflector head supporting rods.

2. A vibrationless projection printer having all heavy parts below table level, camera and other adjustment operations carried out at table level and light projected downwardly from above with clear intervening space for observation and free manipulation and comprising a cabinet of heavy, substantial construction having a table top provided with a light aperture therein, a lamphouse in the body of the cabinet and directed upwardly through said light aperture, spaced supporting rods guided for vertical movement up through said table top and rigidly connected together at their lower ends by a heavy brace disposed within the cabinet below said table top, a reflector head mounted on said supporting rods and having a back reflector disposed above the light aperture and a front reflector in the line of projection of said back reflector and directed downwardly toward the table top and means for effecting vertical adjustments of said reflector head supporting rods, camera units adapted to be interposed between the table top and the back reflector and companion means on said table top and camera units for positioning and supporting said camera units in predetermined positions on the table top over said light aperture.

3. A vibrationless projection printer having all heavy parts below table level, camera and other adjustment operations carried out at table level and light projected downwardly from above with clear intervening space for observation and free manipulation and comprising a cabinet of heavy, substantial construction having a table top provided with a light aperture therein, a lamphouse in the body of the cabinet and directed upwardly through said light aperture, spaced supporting rods guided for vertical movement up through said table top and rigidly connected together at their lower ends by a heavy brace disposed within the cabinet below said table top, a reflector head mounted on said supporting rods and having a back reflector disposed above the light aperture and a front reflector in the line of projection of said back reflector and directed downwardly toward the table top and means for effecting vertical adjustments of said reflector head supporting rods, camera units adapted to be interposed between the table top and the back reflector and companion means on said table top and camera units for positioning and supporting said camera units in predetermined positions on the table top over said light aperture and including quadrilaterally disposed positioning elements about the light aperture enabling positioning of the camera units in four different angular relations.

4. A vibrationless projection printer having all heavy parts below table level, camera and other adjustment operations carried out at table level and light projected downwardly from above with clear intervening space for observation and free manipulation and comprising a cabinet of heavy, substantial construction having a table top provided with a light aperture therein, a lamphouse in the body of the cabinet and directed upwardly through said light aperture, spaced supporting rods guided for vertical movement up through said table top and rigidly connected together at their lower ends by a heavy brace disposed within the cabinet below said table top, a reflector head mounted on said supporting rods and having a back reflector disposed above the light aperture and a front reflector in the line of projection of said back reflector and directed downwardly toward the table top, means for effecting vertical adjustments of said reflector head supporting rods and means associated therewith for locking the supporting rods in different positions of adjustment.

5. A vibrationless projection printer having all heavy parts below table level, camera and other adjustment operations carried out at table level and light projected downwardly from above with clear intervening space for observation and free manipulation and comprising a cabinet of heavy, substantial construction having a table top provided with a light aperture therein, a lamphouse in the body of the cabinet and directed upwardly through said light aperture, spaced supporting rods guided for vertical movement up through said table top and rigidly connected together at their lower ends by a heavy brace disposed within the cabinet below said table top, a reflector head mounted on said supporting rods and having a back reflector disposed above the light aperture and a front reflector in the line of projection of said back reflector and directed downwardly toward the table top, means for effecting vertical adjustments of said reflector head supporting rods and means for effecting relative horizontal adjustments of said front and back reflectors toward and away from each other.

6. A vibrationless projection printer having all heavy parts below table level, camera and other adjustment operations carried out at table level and light projected downwardly from above with clear intervening space for observation and free manipulation and comprising a cabinet of heavy, substantial construction having a table top provided with a light aperture therein, a lamphouse in the body of the cabinet and directed upwardly through said light aperture, spaced supporting rods guided for vertical movement up through said table top and rigidly connected together at their lower ends by a heavy brace disposed within the cabinet below said table top, a reflector head mounted on said supporting rods and having a back reflector disposed above the light aperture and a front reflector in the line of projection of said back reflector and directed downwardly toward the table top and means for effecting vertical adjustments of said reflector head supporting rods, said reflector head being removable from said supporting rods and reengageable thereon in reversed relation to locate the front reflector over the light aperture.

7. A vibrationless projection printer having all heavy parts below table level, camera and other adjustment operations carried out at table level and light projected downwardly from above with clear intervening space for observation and free manipulation and comprising a cabinet of heavy, substantial construction having a table top provided with a light aperture therein, a lamphouse in the body of the cabinet and directed upwardly through said light aperture, spaced supporting rods guided for vertical movement up through said table top and rigidly connected together at their lower ends by a heavy brace disposed within the cabinet below said table top, a reflector head mounted on said supporting rods and having a back reflector disposed above the light aperture and a front reflector in the line of projection of said back reflector and directed downwardly toward the table top and means for effecting vertical adjustments of said reflector head supporting rods and a camera unit engageable over said table top, said reflector head having cooperable means to form a light enclosure from the table top to said reflector head.

8. A vibrationless projection printer having all heavy parts below table level, camera and other adjustment operations carried out at table level and light projected downwardly from above with clear intervening space for observation and free manipulation and comprising a cabinet of heavy, substantial construction having a table top provided with a light aperture therein, a lamphouse in the body of the cabinet and directed upwardly through said light aperture, spaced supporting rods guided for vertical movement up through said table top and rigidly connected together at their lower ends by a heavy brace disposed within the cabinet below said table top, a reflector head mounted on said supporting rods and having a back reflector disposed above the light aperture and a front reflector in the line of projection of said back reflector and directed downwardly toward the table top and means for effecting vertical adjustments of said reflector head supporting rods, an inclined instrument panel at the front of the cabinet below the table top and said table top having a transparent panel at the front portion of the same over said instrument panel.

9. A vibrationless projection printer having all heavy parts below table level, camera and other adjustment operations carried out at table level and light projected downwardly from above with clear intervening space for observation and free manipulation and comprising a cabinet of heavy, substantial construction having a table top provided with a light aperture therein, a lamphouse in the body of the cabinet and directed upwardly through said light aperture, spaced supporting rods guided for vertical movement up through said table top and rigidly connected together at their lower ends by a heavy brace disposed within the cabinet below said table top, a reflector head mounted on said supporting rods and having a back reflector disposed above the light aperture and a front reflector in the line of projection of said back reflector and directed downwardly toward the table top, means for effecting vertical adjustments of said reflector head supporting rods and means for enabling various angular adjustments of said front reflector to swing the downwardly directed beam projected therefrom into different inclined relations.

10. A vibrationless projection printer having all heavy parts below table level, camera and other adjustment operations carried out at table level and light projected downwardly from above with clear intervening space for observation and free manipulation and comprising a cabinet of heavy, substantial construction having a table top provided with a light aperture therein, a lamphouse in the body of the cabinet and directed upwardly through said light aperture, spaced supporting rods guided for vertical movement up through said table top and rigidly connected together at their lower ends by a heavy brace disposed within the cabinet below said table top, a reflector head mounted on said supporting rods and having a back reflector disposed above the light aperture and a front reflector in the line of projection of said back reflector and directed downwardly toward the table top, means for effecting vertical adjustments of said reflector head supporting rods and means for introducing distortion effects into the beam projected as described.

11. A vibrationless projection printer having all heavy parts below table level, camera and other adjustment operations carried out at table level and light projected downwardly from above with clear intervening space for observation and free manipulation and comprising a cabinet of heavy, substantial construction having a table top provided with a light aperture therein, a lamphouse in the body of the cabinet and directed upwardly through said light aperture, spaced supporting rods guided for vertical movement up through said table top and rigidly connected together at their lower ends by a heavy brace disposed within the cabinet below said table top, a reflector head mounted on said supporting rods and having a back reflector disposed above the light aperture and a front reflector in the line of projection of said back reflector and directed downwardly toward the table top, means for effecting vertical adjustments of said reflector head supporting rods and means within said cabinet for counter-balancing said supporting rods and reflector head carried thereby.

HERBERT C. McKAY.

REFERENCES CITED

The following references are of record in the file of this patent:

UNITED STATES PATENTS

| Number | Name | Date |
|---|---|---|
| 1,199,941 | Taylor | Oct. 3, 1916 |
| 1,934,582 | Bausch | Nov. 7, 1933 |
| 2,064,368 | Bausch | Dec. 15, 1936 |
| 2,100,967 | Levy | Nov. 30, 1937 |
| 2,113,309 | Murray | Apr. 5, 1938 |
| 2,121,061 | Townsend | June 21, 1938 |
| 2,229,284 | Fassin | Jan. 21, 1944 |